United States Patent [19]
Morton

[11] Patent Number: 5,966,506
[45] Date of Patent: Oct. 12, 1999

[54] METHOD FOR PRINTING ELECTRONICALLY SHARPENED IMAGES

[75] Inventor: Roger R. A. Morton, Penfield, N.Y.

[73] Assignee: Eastman Kodak Company, Rochester, N.Y.

[21] Appl. No.: 08/882,905

[22] Filed: Jun. 26, 1997

[51] Int. Cl.⁶ .............................. G06F 15/00; G06K 9/36
[52] U.S. Cl. ....................... 395/109; 395/101; 382/256; 382/269
[58] Field of Search ...................................... 395/101, 109, 395/111, 112, 113; 355/22; 382/256, 266, 269

[56] References Cited

U.S. PATENT DOCUMENTS

| | | |
|---|---|---|
| 4,074,231 | 2/1978 | Yajima et al. . |
| 4,263,616 | 4/1981 | Lee . |
| 4,454,533 | 6/1984 | Lagoni . |
| 4,785,347 | 11/1988 | Ezuka et al. . |
| 4,918,528 | 4/1990 | Oohashi . |
| 4,972,256 | 11/1990 | Hirosawa et al. . |
| 5,012,333 | 4/1991 | Lee et al. .................................. 355/22 |
| 5,276,478 | 1/1994 | Morton ..................................... 355/22 |
| 5,455,689 | 10/1995 | Taylor et al. ............................ 358/450 |
| 5,491,520 | 2/1996 | Nozawa et al. . |

*Primary Examiner*—Edward L. Coles
*Assistant Examiner*—Mark Wallerson
*Attorney, Agent, or Firm*—Gordon M. Stewart

[57] ABSTRACT

A method of printing an image with an electronically sharpened edge. The method uses an image writing medium to form an image on a substrate. The image is printed using a range of writing medium exposures greater than a standard range. The standard range is the range required to insure that macroscopic areas of the substrate exhibit the full density range of the substrate between Dmin and Dmax. Such printing provides that sharpened edges of the image will be printed with reduced clipping of sharpened edge density. An apparatus for executing the method is also provided.

17 Claims, 7 Drawing Sheets

METHOD FOR PRINTING ELECTRONICALLY SHARPENED IMAGES

FIELD OF THE INVENTION

The invention relates generally to the field of photography, and in particular to printing black and white and color images.

BACKGROUND OF THE INVENTION

In electronic processing of signals, particularly video and other image data signals, it is well known to sharpen an image by providing peaking by using a filter which amplifies high frequency portions of the signal. Sharpening then, results in enhanced edges. This sharpening or peaking technique can however result in signals whose amplitude exceeds the available dynamic range of signal functions which occur subsequently to the point where peaking is applied to the signal. For example, the dynamic range of a film on which an electronically sharpened image is printed, may not accommodate the increased dynamic range of the image produced by the sharpening. In such a situation, any sharpening performed on the image may be lost when the image is printed on such film.

Integral images are images where sharpening may be particularly desirable to enhance visual appearance. Integral image elements which use a lenticular lens sheet, fly's eye lens sheet, or barrier strip sheet and a three-dimensional integral image aligned with the sheet, so that a user can view the three-dimensional image without any special glasses or other equipment, are themselves well known. Such imaging elements and their construction, are described in "Three-Dimensional Imaging Techniques" by Takanori Okoshi, Academic Press, Inc., New York, 1976. Integral image elements having a lenticular lens sheet (that is, a sheet with a plurality of adjacent, parallel, elongated, and partially cylindrical lenses) are also described in the following Unites States patents: U.S. Pat. No. 5,391,254; U.S. Pat. No. 5,424,533; U.S. Pat. No. 5,241,608; U.S. Pat. No. 5,455,689; U.S. Pat. No. 5,276,478; U.S. Pat. No. 5,391,254; U.S. Pat. No. 5,424,533 and others; as well as allowed U.S. patent application Ser. No. 07/931,744.

Integral image elements with a plurality of views to simulate motion of an object in a scene, rather than a three-dimensional image, are also known. It has also been disclosed in U.S. Pat. No. 3,562,941, to move a lenticular image with respect to a lenticular lens sheet so that different images could be viewed from the same location.

Integral image elements with lenticular lens sheets use interlaced vertical image slices which, in the case of a three-dimensional integral image, are aligned with the lenticules so that a three-dimensional image is viewable when the lenticules are vertically oriented with respect to a viewer's eyes. The image may be conveniently laminated (that is, adhered) to an integral or lenticular lens sheet.

Similar integral image elements, such as described in U.S. Pat. No. 3,268,238 and U.S. Pat. No. 3,538,632, can be used to convey a number of individual two-dimensional scenes (such as unrelated scenes or a sequence of scenes depicting motion) rather than one or more three-dimensional images.

Because an integral image uses thin strips or slices from each two-dimensional image, sharpening integral images particularly enhances their perception.

It would be desirable then, to provide a means which allows an image, such as an integral image, to be sharpened particularly using electronic sharpening, and which allows the sharpened image to be reproduced on a suitable media, without losing the enhanced appearance from sharpening.

SUMMARY OF THE INVENTION

The present invention takes advantage of the fact that for many substrates used as an image output media, the exposure dynamic range (that is, the range of possible density levels which the substrate can exhibit) is dependent upon the size of the exposed region over which dynamic range is determined. For example, photographic films, thermal print and other print media have an exposure dynamic range which when measured on a micro scale, can actually be higher than the exposure dynamic range measured on a macro scale. Furthermore, in other printing devices where the dynamic range exhibited by a substrate onto which an image is printed, is fixed, such as in an inkjet printer printing with a given ink on a given paper, the present invention takes advantage of the fact that reduced clipping of a sharpened edge can still be obtained by control of the amount of ink applied to a given region of the substrate.

The present invention then, provides a method of printing an image with an electronically sharpened edge, by using an image writing medium to form an image on a substrate, comprising:

printing the image using a range of writing medium exposures greater than a standard range, which standard range is the range required to insure that macroscopic areas exhibit the full density range of the substrate between Dmin and Dmax, so that sharpened edges of the image will be printed with reduced clipping of sharpened edge density.

The image writing medium is the medium which causes the image to be formed on the substrate. For example, this may be a laser or other light source in a photographic printer which actually falls upon the substrate (thus, in a photographic printer printing a negative, this may be the light which has already passed through the negative), or the amount or velocity of ink in an inkjet or other printer which is actually applied to an output substrate. In a laser printer, the laser is modulated in accordance with the sharpened image signal. In the foregoing method the image may be printed with a range of exposures such as a range which is at least 30%, 25% or 10% greater than the standard exposures. The "standard exposures" are determined as those exposures sufficient to insure that macroscopic areas (that is, relatively large areas) of the substrate exhibit the full possible density range (minimum to maximum density, sometimes referenced as Dmin and Dmax, respectively ) of the media. By macroscopic or relatively large areas is referenced areas greater than typically 1 millimeter in at least one, and more typically both, dimensions. The input image can be any suitable image, including conventional two-dimensional images of the real world (such as captured by a photographic film or electronic camera) or electronically generated images. In particular, the input image which has been electronically sharpened, may be an integral image or the conventional two-dimensional images which may be used to make an integral image exhibiting depth or motion. The "exposure" levels refers to the product of writing medium amplitude and time (that is, the total amount of light which has fallen on a given region of a photographic substrate in a photographic system, or the total amount of ink or colorant applied to a given region of a substrate in a system printing by applying a colorant). Thus, the exposure can be increased by increasing a writing medium amplitude or the time duration for which it is present, for a given location on the output substrate. In either event a greater amount of the writing medium is applied. The input image can be any type of image (particularly an integral image), including continuous tone images or images composed of discrete image elements (for example, pixels) which are uniform in chrominance and luminance (as occurs in a halftone printing method).

The present invention provides a means by which an image, particularly an integral image, which has been sharpened electronically, to be printed on a suitable substrate without losing all the enhanced appearance available from sharpening.

BRIEF DESCRIPTION OF THE DRAWINGS

Embodiments of the invention will now be described with reference to the drawings, in which.

To facilitate understanding, identical reference numerals have been used, where possible, to designate identical elements that are common to the figures.

DETAILED DESCRIPTION OF THE INVENTION

The present invention takes advantage of the fact that for many output media (that is, the substrate onto which the image is written), the exposure dynamic range is dependent upon the size of the exposed region over which dynamic range is determined. For example, photographic films, thermal print and other print media have an exposure dynamic range which when measured on a micro scale, can actually be higher than the exposure dynamic range measured on a macro scale. This extension of the exposure range can occur at both ends of the exposure scale. In other media, the invention takes advantage of the fact that controlling the writing medium can allow control of how a sharpened edge will appear on the substrate.

For example, in certain printing and photographic film exposure techniques the exposure characteristics ensures that a standard exposure which is greater than zero is required for minimum exposure. This characteristic can be optimized by providing that a writing medium characteristic (such as light exposure in a photographic system) is used which ensures that the writing medium intensity is equal to or less than the standard minimum exposure near edges where peaking occurs. Similarly exposure greater than the standard maximum exposure which provides maximum density on the medium is used so that even when the peaking (that is, sharpening) signal amplitude outside of the printing range the sharpened edge signal peak still provides an enhanced edge on the output substrate and does not encounter clamping due to saturation.

This principle can also be applied to ink jet printing and other dye based applications where diffusion of the ink across the substrate causes the sharp edges to appear "softer".

Figure 1A:
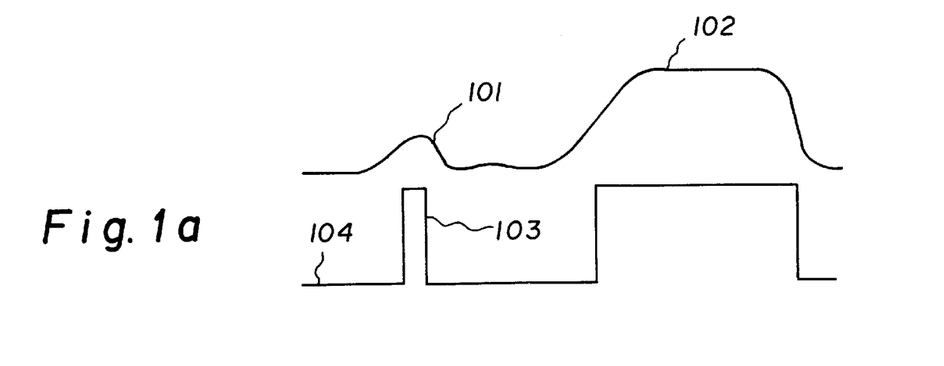
FIGS. 1a–1c are graphs illustrating density level profiles on a photographic substrate and corresponding image signals.
Figure 1B:
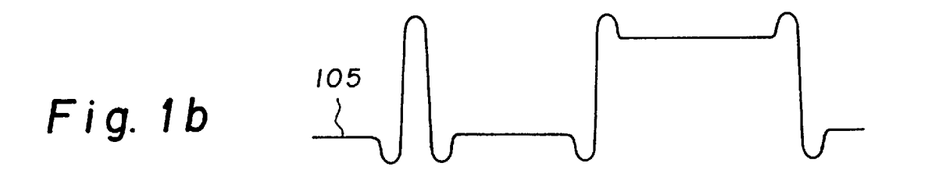
Figure 1C:
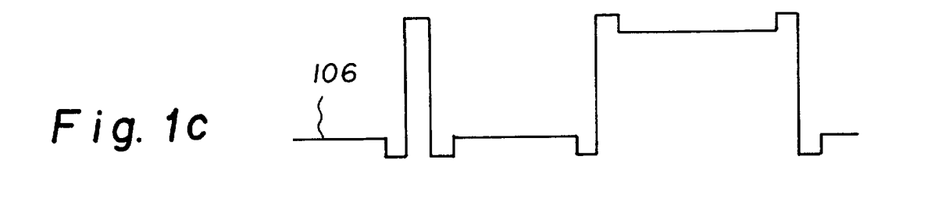

FIGS. 1a, 1b, and 1c show the measured line or film density response 101 of exposed film to a narrow edge and then the step density response 102 that results from the same exposure when a step occurs. In FIGS. 1a–1c and the remainder of the figures, unless otherwise indicated "E" represents an exposure level and "D" represents the resulting optical density on an output substrate. As can be seen the narrow edge or line response 101 does not meet its full amplitude (and is also wider than the expected line shown below 103) which corresponds to the expected profile had the printing material reproduced the profile without any loss of resolution. However if the profile 104 shown in FIGS. 1a–1c is passed to a peaking function it will result in a profile 105 which may fall outside the dynamic range of subsequent functions so that it effectively appears clipped on the output medium, as illustrated by clipped profile 106. As a result the peaking signal (that is, sharpening signal) used to correct for sharpness loss in a function beyond where the clipping occurs is attenuated and does not compensate for loss of sharpness.

Figure 2A:
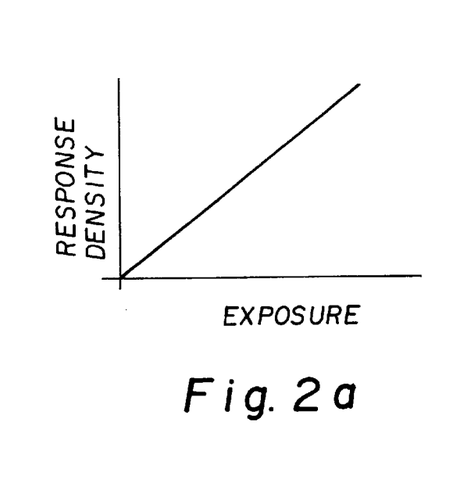
FIGS. 2a and 2b illustrate a typical characteristic response curve (exposure versus density) of a photographic film in a linear and log scale, respectively.
Figure 2B:
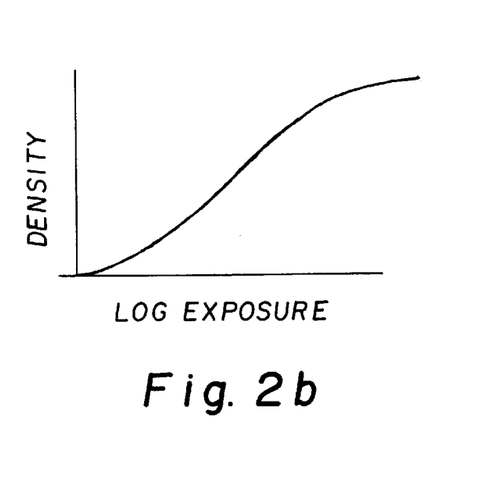
Figure 3A:
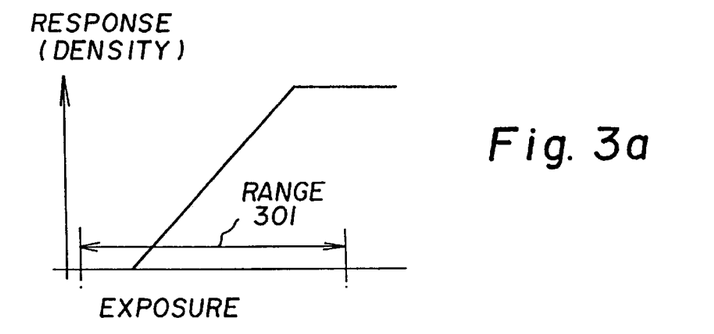
FIGS. 3a and 3b illustrate a characteristic response curve for another photographic film, in a linear and log scale, respectively.
Figures 3B, 4A:
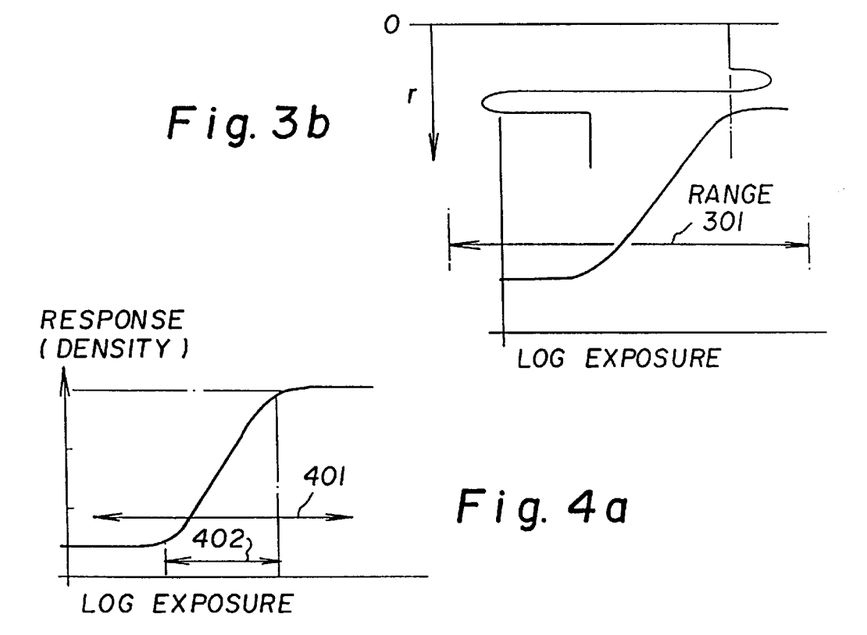
FIGS. 4a and 4b illustrate characteristic log response curves for photographic substrates used in a photographic printing method employing the method of the present invention.
Figure 4B:
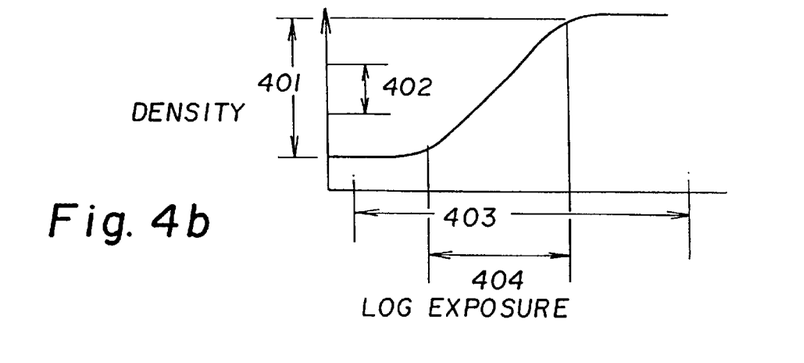

In film printing and other printing methods this loss of sharpness actually occurs within the printed media itself and writing techniques are unable to handle the expanded dynamic range and thereby do not deliver the peaked signal necessary to correct for loss of resolution. One reason for this is shown in FIG. 2 which shows on linear scale an exposure versus print response curve for example plotting exposure as light in and response being transmission or reflection out or shown on a log scale of density as FIG. 2b. By modifying the exposure characteristics of the film or other printing material as shown in FIG. 3a linear and 3b on a log scale and then modifying the writing technique so that the exposure can subtend the exposure range 301 it is possible to ensure that the peaks are not clipped as shown by profile 106 but rather correspond to profile 105 at the point where the loss of resolution in the printing process occurs. This can be done in either direct printing systems or in two step systems such as printing negative film. In two step systems the final print exposure enhances contrast by having a wider dynamic range of density produced in response than the range of density required in exposure. In typical film systems this contrast enhancement may fall in the range of 1.5 to more than 6 times as shown in FIG. 4a. Therefore it is necessary that the first printing step or negative step can furnish to the final printing step a wider exposure range 401 than the exposure range 402 necessary to produce in the block areas of color or density the full maximum to minimum response (that is, optical film density), as shown in the characteristic curve of FIG. 4b. Note that the corresponding resulting denisty ranges are shown with the same references, 401, 402 on the Density axis of FIG. 4b. Similarly when exposing the negative it is necessary that the available dynamic printing range 403 is wider than the exposure required for the maximum to minimum density range 404.

Figure 5:
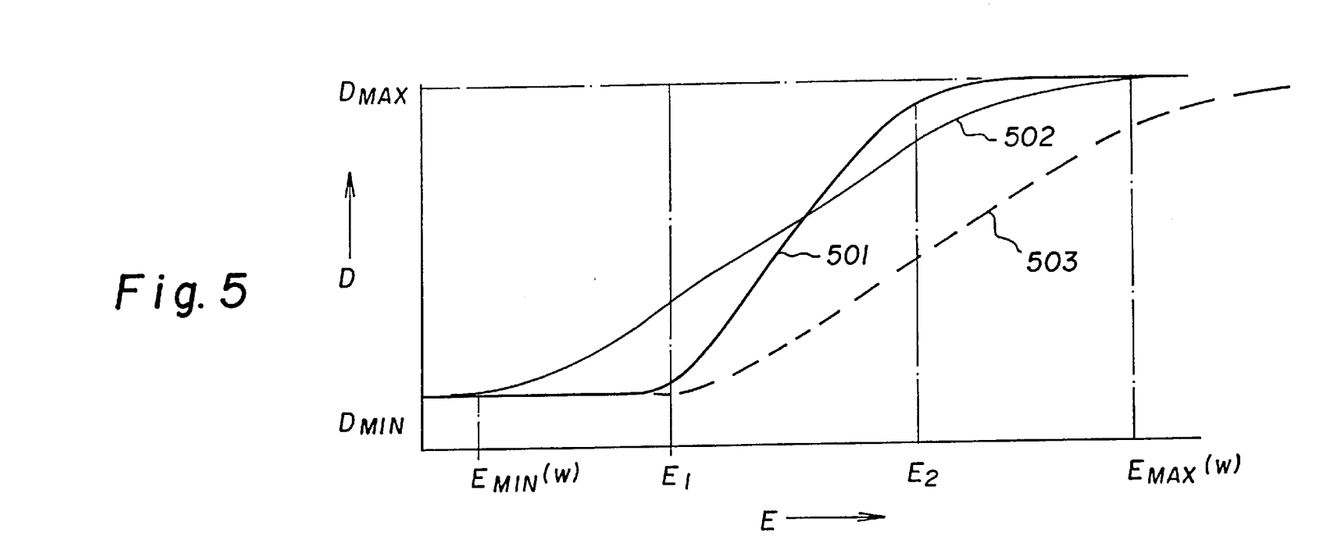
FIG. 5 is a characteristic log response curve for another photographic substrate illustrating in a different manner, the operation of the present invention.
Figure 6:
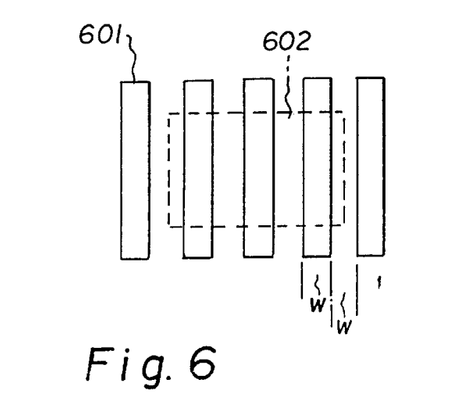
FIG. 6 is a test pattern image from which the curves shown in FIG. 5 can be obtained.

FIG. 5 shows another way of appreciating how this present invention operates. Along the horizontal axes film Exposure is plotted and the vertical axis corresponds to Density. $E_1$ is the minimum exposure required to produce the density $D_{MIN}$ over an area of the image large enough not to be limited by resolution limitations of the photographic film being characterized. $E_2$ corresponds to the exposure required to produce a density level corresponding to $D_{MAX}$ over an area large enough not to be limited by the resolution limitations of the film. The film characteristic across areas large enough not to be limited by the resolution limitation of the film (macroscopic sized areas) are characterized by the macroscopic characteristic curve 501. Once the size of the areas being characterized are reduced to less than macroscopic size (that is, less than about 1 millimeter in at least one direction, or optionally in both directions) then the effective slope of the curve relating exposure to density becomes reduced and so for a specified size of narrow line being produced the characteristic curve 502 is obtained. This curve can be obtained by exposing test patterns such as those shown in FIG. 6 at various exposure levels and density ranges and then measuring using microdensitometry the density of specific black lines for example 601 and the density of specific light lines for example 602 using a microdensitometer. For a given line width W and line spacing W a curve such as 502 can be produced and the D$MIN$ level is obtained at exposure $E_{MIN}(W)$ and the $D_{MAX}$ density level is obtained at exposure $E_{MAX}(W)$. It will be appreciated that because of the small dimensions involved in w as a practical manner this transfer curve 502 will be influenced by the size of the writing spot exposing the film. For example, a characteristic curve 503 might be obtained with a different sized writing spot.

Figure 7:
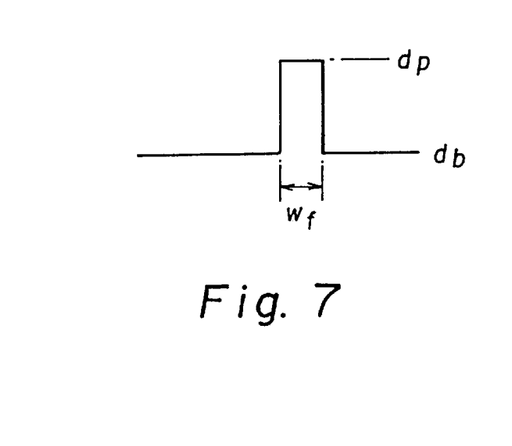
FIG. 7 illustrates one of the features in the pattern of FIG. 6.

Thus to accurately obtain a given exposure level for a given line width it is necessary to understand the microdensometric transfer characteristics of the film. These can be thought of for single small features of width "w at "wf" shown in FIG. 7 on a desired density background "db" with a peak density level of "dp". To require an exposure amplitude "E" which is a function of w[<i]nff dp and db. If the photographic film is assumed to behave in a linear manner then the relationship between exposure and density can be treated as a linear transfer function and the loss of resolution of the film can be treated as being characterized by poles and zeroes in the transfer characteristic. However in general film and other printed material do not have a linear transfer function especially for large changes in density and therefore it may be necessary to accurately characterize the response characteristic in terms of a function such as the one where required exposure is a function of wf, dp and db.

These exposure characteristics can be determined experimentally by generating lines of specific widths and amplitudes in response to given exposure levels as a function of measured background density db and amplitude response dp for various feature widths w. It will be appreciated that this approach applies for representing small features on a uniform background. However a more detailed characterization is required for large amplitude swings where the texture is more dramatic. For small amplitude swings linear approximations whose characteristics such as transfer characteristics and pole zero values are characterized as a function of average background density.

Figure 8:
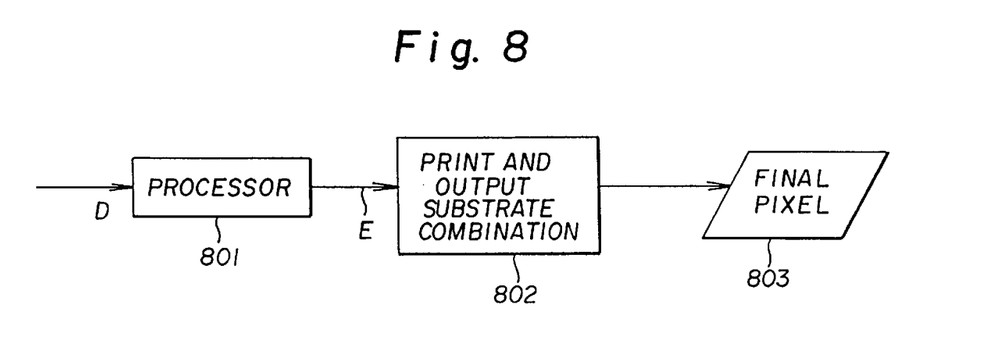
FIG. 8 schematically illustrates one apparatus of the present invention implementing the method of the present invention.

In this case for a given average density transfer characteristics slope relating exposure in to resulting density can be characterized by a slope S while the resolution characteristic can be characterized by poles p1, p2, p3 . . . and zeroes z1, z2, z3 . . . All these values including the slope and pole values are a function of average background density for the small signal excursion. Given these characteristics it is possible to digitally generate a peaking function for the purpose of producing the final desired response signal This implementation is shown in FIG. 8 where incoming signal data corresponding to the desired density d is passed to processor 801 which processor implements a sharpening filter function based on the internally stored small signal slope s and small signal pole zero values as a function of average density. These have been previously characterized for a printer and printer ouptut substrate (for example, the printer paper) combination 802 which produces the final print 803. The processor 801 may characterize the desired response by using inverse techniques such as Newton Raphson or conjugate method technique. It will be appreciated in the present application that by a "processor" or "microprocessor" is referenced a suitably programmed processor, such as a suitably programmed general purpose digital computer processor, or any hardware and/or software combination which can execute the required steps.

Figure 9:
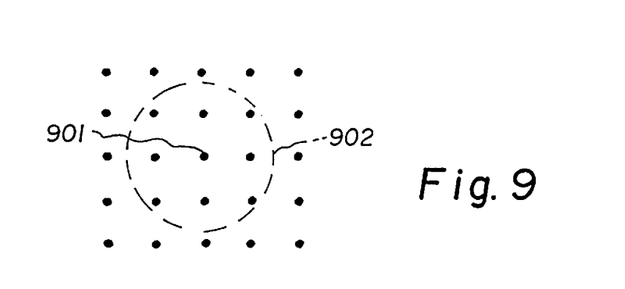
FIG. 9 illustrates an effective writing spot size for a particular printer having a given writing medium and output substrate.

This same method can also be used for larger signals however the results will not always be as accurate. In digital processing methods where pixels are written at discrete locations on the print material the problem is better defined because the resolution characteristic is spatially a function across an area which is enclosed by a finite number of pixels. This area corresponds to the effective writing spot size of the combination of the printer and the media and as shown in FIG. 9 can be defined for pixel 901 across a range of pixels adjacent to the effective spots 902. Thus in a non-linear sense the desired response of exposure E at pixel 901 can be defined as a function of the surrounding desired pixel densities.

Figure 10:
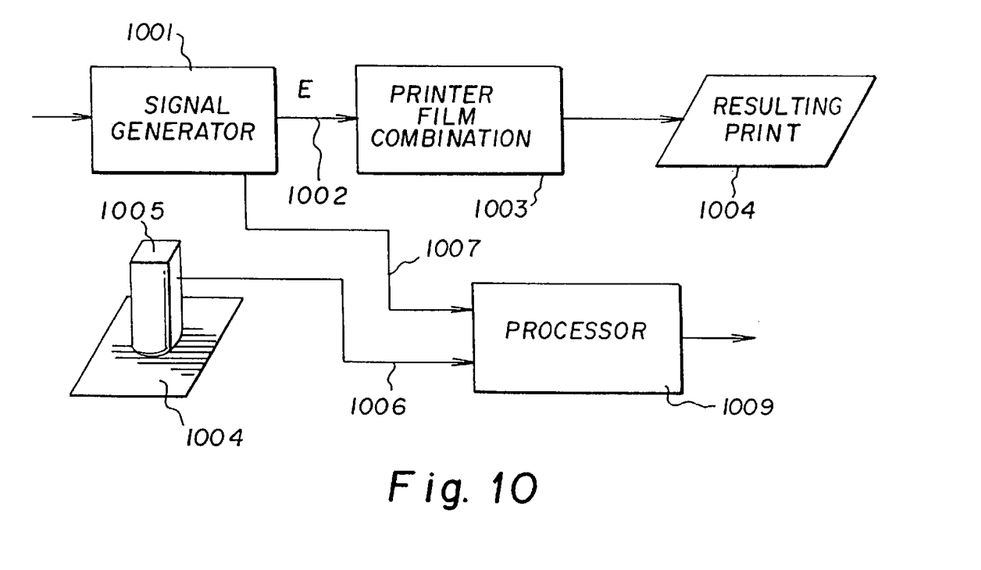
FIG. 10 schematically illustrates another apparatus of the present invention.

A function can be experimentally determined by using Microdensitometry to measure the responses of the printed medium to specific exposure combinations of a group of pictures such as that shown in FIG. 9. This will be performed as shown in FIG. 10 whereas signal generator 1001 generates exposures on line 1002 to printer film combination 1003 and the resulting print 1004 is then analyzed using microdensitometer 1005 which produces data concerning the density patterns on lines 1006 and this data is correlated with the exposure information used to generate the patterns on line 1007 by processor 1009 using Newton Raphson techniques to produced polynomial coefficients of the same order as the number of sampled pixels in the sampled area shown in FIG. 9.

Figure 11:
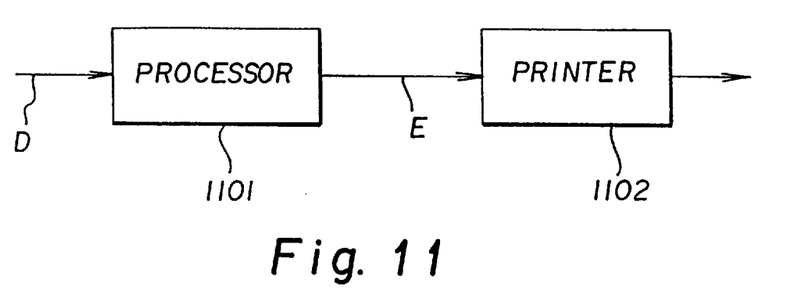
FIG. 11 is a schematic diagram of components of an apparatus of the present invention.

These polynomial coefficients are then used to calculate an inverse polynomial and this inverse polynomial is used by processor 1101 in FIG. 11 to calculate desired exposure levels E to send to printer 1102.

In summary then we have discussed a method for treating nonlinear small excursions of printed material as well as nonlinear large excursions for digital printers printing in a pixel pattern Another special situation is accurately handling the sharpening of printed areas when the required density is close to the DMA or DIN range of the printed material. In this case it will be necessary to generate exposure levels which arc outside the range of conventional exposures E1 and E2 shown in FIG. 5 in order to compensate for the loss of signal amplitude in small areas. One way to model this loss of amplitude was described with reference to FIG. 5 with curve 502 which showed an effective transfer characteristic for a given line width. The methods described with reference to FIGS. 8, 9, 10 and 11 as well as conventional linear sharpening techniques using conventional filtering approaches can all produce amplitudes of desired exposure in excess of the conventional range.

Figure 12:
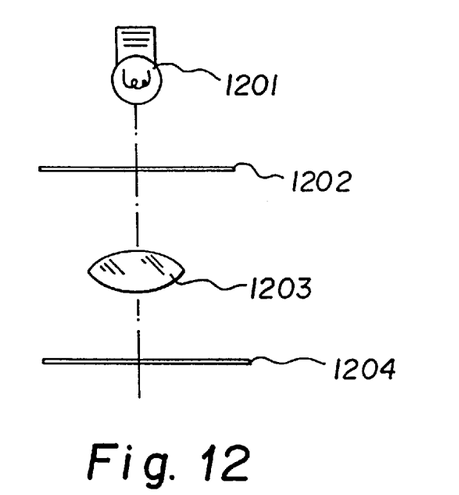
FIG. 12 schematically illustrates a photographic printer used to execute a method of the present invention.
Figure 13:
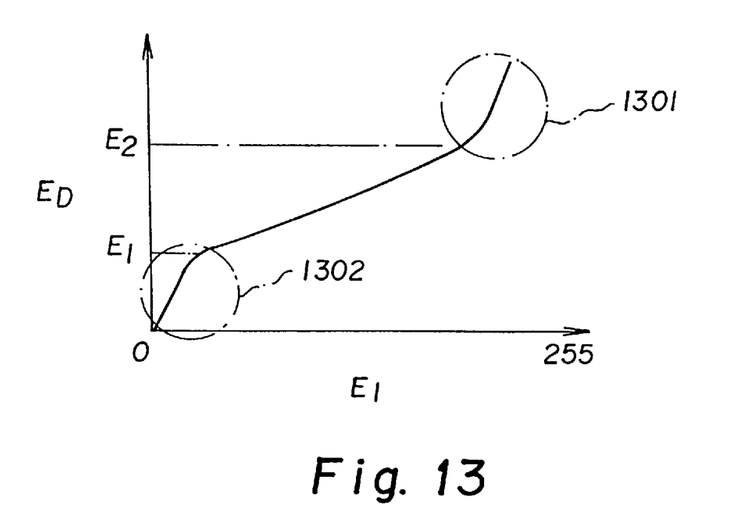
FIG. 13 is a graph of printing medium exposure versus incoming signal (image signal) to a printer, and illustrates application of a method of the present invention as applied to such a printer.

The key element however is to design the printer media combination in such a way as to be able to accommodate these larger excursions. As we mentioned this is particularly necessary when making prints from negatives when it is essential that the negative range of density when translated back to exposure when exposing the final print is able to provide exposure ranges for the final print outside of the conventional E1 to E2 range. This is done by ensuring that the negative DMAX to DMIN range will in the printer produce exposures to the MIN to MAX range the two key selection characteristics are the sufficient illumination of the printer and choosing a negative with sufficient to DMAX range. FIG. 12 shows this where light source 1201 illuminates negative 1202 through lens 1203 to expose print material 1204. Another key element is the design of the print material such that the minimum exposure E1 to give a DMIN value is greater than zero exposure level. Another step in the design of the printer is to generate lookup tables between the incoming exposure data which may only be eight bit digital data, and the exposure output of the printing medium of the printer such that it has a characteristic as shown in FIG. 13. In FIG. 13 E1 is the incoming exposure signal (that is, the image signal) and Ed is the driving signal to the exposing device (that is, writing medium), and the values in the curve regions 1301 and 1302 provide the necessary additional range to overdrive the print material outside of the standard exposure range represented by the range between E1 to E2. The advantage of this approach is to provide the overdrive range without consuming too much of the available digital range which could result in banding if this approach were not taken.

Figure 14:
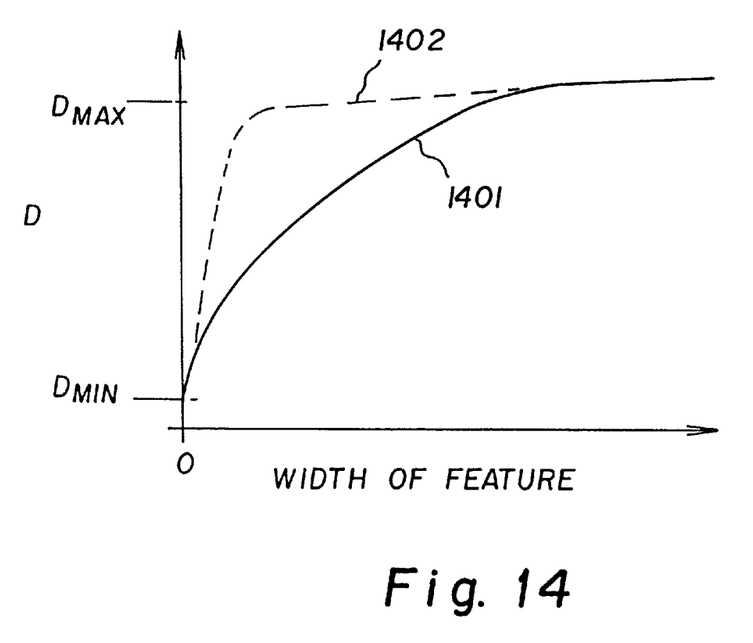
FIG. 14 illustrates shows the effective result of application of a method of the present invention.

FIG. 14 shows the effective result of this driving technique. In FIG. 14 the horizontal axis shows the width of a small feature while the vertical axis shows the DMAX obtainable for the peak value of this feature. The solid curve 1401 corresponds to the available response of the feature assuming it is on a background DMIN using conventional approaches, while the dotted curve 1402 shows the response as a result of applying the printer overdriving technique discussed in this invention.

Figure 15:
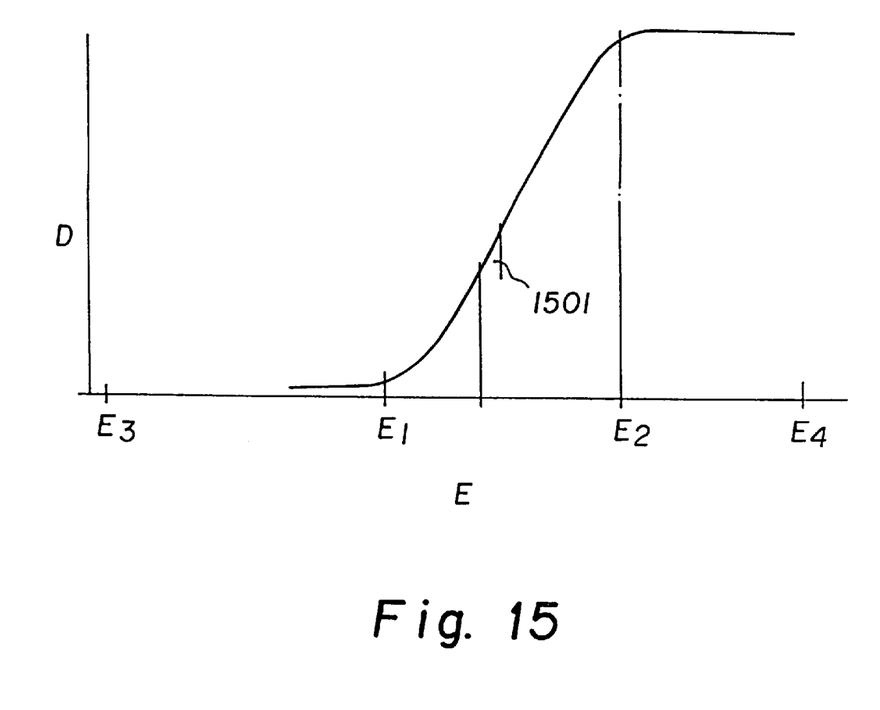
FIG. 15 is a Density versus Exposure characteristic curve (log scale) for a high contrast (gamma value) photographic film and illustrates the benefits of using such a film in a method of the present invention.
Figure 16:
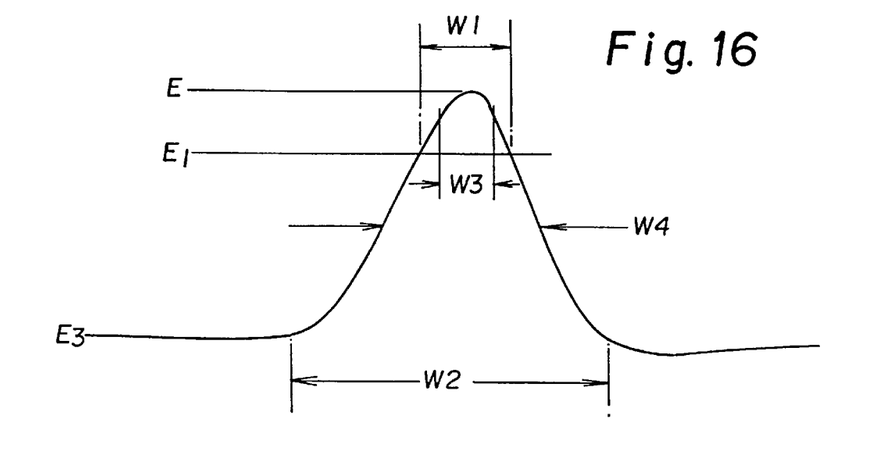
FIG. 16 illustrates effective spot exposure versus effective spot width for the film of FIG. 15 using a method of the present invention.

FIG. 15 also illustrates the benefits of using a stable high gamma film (that is, a film with a steep slope in the linear portion of a Density versus Exposure characteristic log curve). Such a film has a film characteristic curve 1501 and the normal exposure range is from E1 (corresponding to Dmin) to E2 (corresponding to Dmax). It may be desired to write a light spot on the film with the spot profile be as shown in FIG. 16 where the bottom of the spot corresponds to exposure E3 and the top corresponds to an exposure of E. If E1 is the toe exposure of the characteristics curve and E2 is the shoulder exposure then the effective spot width at exposure E1 is w1 compared to the actual base spot width of w2 and the 50% exposure is w3 compared to the 50% amplitude of the spot of w4. Thus an enhancement of sharpness is achieved by making the wide dynamic range of E3 to E4 possible compared to the toe to shoulder range of E1 to E2. Consequently this is an additional benefit of the present invention in terms of enhancing the sharpness of images.

Ideally the electronic sharpening function will be created taking into account by experimental, analytical or other imaging system analysis methods, the characteristics of the writing system, media and viewing conditions (including the reflection characteristics of the reflective layer in the case of reflection prints). In particular, the standard range of input writing medium exposures, can be readily ascertained from a manufacturer's specifications (such as specifications for a photographic film) or experimentally. For example, for an inkjet printer, the standard range can be ascertained as the minimum range of input signals to the write head of the printer, required to allow for relatively large areas on the output medium (typically paper) to be fully saturated to exhibit the full density range of the output medium. As to the sharpening function used in any case, many methods of electronically sharpening images are well known, particularly in the art of digital image processing. Image writing systems other than those using a light source to print onto a light sensitive photographic film (whether paper or transparent substrate) can of course be used. These include inkjet, thermal, and laser printers which use a xerographic process with a photoconductive medium which receives the laser writing medium before printing an image onto the output paper.

Figure 17A:
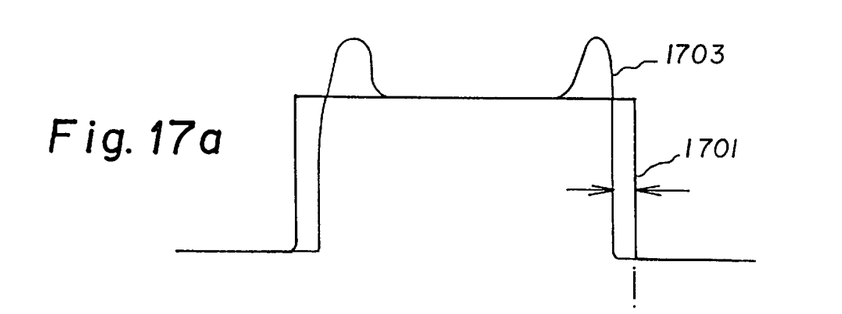
FIGS. 17a and 17b are graphs of image signals representing a feature in an image with edges before and after electronic sharpening according to a method of the present invention (top graph), and a graph of corresponding densities at positions across an output substrate, for an inkjet or similar printer (bottom graph).
Figure 17B:
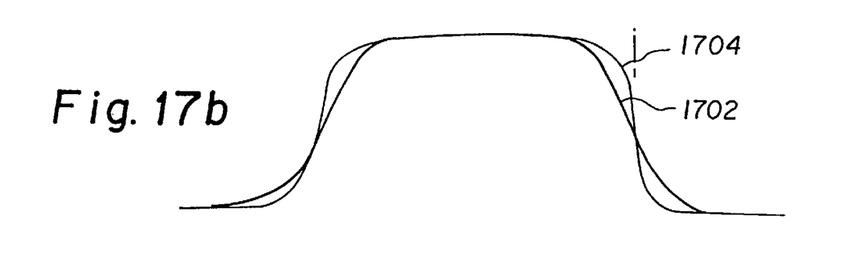

In the case of inkjet printing, the sharpening function should compensate for ink diffusion on the output medium (typically, paper) by narrowing the width of the driving signal profile. However, to compensate for this narrowing, the sharpening function must also provide that the density of ink placed at the location of a sharpened edge in the image, be greater than normal maximum values (that is, greater the print head input signal must provide a range of signal levels greater than the standard range) in order to provide a sharper edge. This is illustrated in FIGS. 17a and 17b where there is shown the conventional response image 1702 on the output substrate (typically the paper), in response to the standard input signal intensity range at the print head. The profile of the standard input signal intensity range is illustrated as signal 1701, which is used to drive an inkjet printer to output (that is, print) a block of image data. On the other hand, sharpened signal profile 1703 shows the signal profile of an input signal intensity level to the printer head, as provided according to the method of the present invention. Signal profile 1703 is provided by using an edge sharpening function to improve the apparent sharpness, and results in a printed image profile response 1704. The difference between profiles 1701 and 1703 corresponds to the correction required for the diffusion of the ink across the substrate.

The invention has been described in detail with particular reference to certain preferred embodiments thereof, but it will be understood that variations and modifications can be effected within the spirit and scope of the invention.

I claim:

1. A method of printing an image with an electronically sharpened edge, by using an image writing medium to form an image on a substrate, comprising:

printing the image using a range of writing medium exposure that is at least 15% greater than a standard range, which standard range is the range required to insure that macroscopic areas exhibit the full density range of the substrate between Dmin and Dmax, so that sharpened edges of the image will be printed with reduced clipping of sharpening edge density.

2. A method according to claim 1, wherein the image is a continuous tone image.

3. A method according to claim 1, wherein the electronically sharpened edge is printed on one side of the sharpened edge with a writing medium exposure level no greater than a standard minimum exposure level which results in Dmin on a macroscopic area of the substrate, and on the other side of the edge with a writing medium exposure level greater than a standard maximum exposure level which results in Dmax on a macroscopic area of the substrate.

4. A method according to claim 1, wherein the image is printed with a range of writing medium exposures that is at least 30% greater than the standard medium levels.

5. A method according to claim 1 additionally comprising electronically sharpening edges of the image before printing it.

6. A method according to claim 1, wherein the printing is performed using a printer and wherein the writing medium of the printer comprises a dye and the writing medium exposures comprise the amount of dye applied to the substrate at a given location.

7. A method according to claim 1, wherein the substrate is a photographic film and the writing medium is light modulated over an area of the film in accordance with an image.

8. A method according to claim 7, wherein the image being printed is provided on a developed photographic film, and the substrate is exposed by directing light through the photographic film onto the substrate.

9. A method according to claim 1, wherein the image is an integral image.

10. A method according to claim 9, wherein the integral image is a lenticular image.

11. A method according to claim 1, wherein the image contains multiple discrete image elements which are uniform in chrominance and luminance.

12. A method according to claim 1, wherein the printing is performed by thermal or inkjet printing.

13. An apparatus for sharpening and printing a continuous tone image signal by using an image writing medium to form an image on a substrate, comprising:

means for electronically sharpening edges of the image signal by using an image writing medium to form an image on a substrate, comprising:

means for electronically sharpening edges of the image signal;

a printer to print the sharpening image signal using a range of writing medium exposures that is at least 15% greater than the standard range required to insure that macroscopic areas exhibit the full density range of the substrate between Dmin and Dmax, to enable sharpened edges to be printed with reduced clipping of sharpened edge density.

14. An apparatus according to claim 13, wherein the printer is a raster matrix printer.

15. An apparatus according to claim 14, wherein the printer is a thermal or inkjet printer and the writing medium exposure is the amount of a colorant applied to a given location on the substrate.

16. An apparatus according to claim 13, wherein the printer is an optical printer which can direct light through the image on a developed photographic film and onto a light sensitive photographic substrate to copy the image.

17. An apparatus according to claim 13, wherein the printer is a printer which directly prints the electronically sharpened image onto a photosensitive substrate by modulating a light beam in accordance with an image signal.

* * * * *